United States Patent
Farrell et al.

(10) Patent No.: US 9,569,882 B2
(45) Date of Patent: Feb. 14, 2017

(54) FOUR CORNER HIGH PERFORMANCE DEPTH TEST

(71) Applicant: Intel Corporation, Santa Clara, CA (US)

(72) Inventors: Robert L. Farrell, Granite Bay, CA (US); Vasanth Ranganathan, Tigard, OR (US); Karol A. Szerszen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 434 days.

(21) Appl. No.: 14/136,290

(22) Filed: Dec. 20, 2013

(65) Prior Publication Data

US 2015/0178982 A1     Jun. 25, 2015

(51) Int. Cl.
*G06T 15/40*     (2011.01)

(52) U.S. Cl.
CPC ......... *G06T 15/405* (2013.01); *G06T 2210/12* (2013.01)

(58) Field of Classification Search
CPC ...... G06T 15/005; G06T 15/405; G06T 15/40; G06T 11/40; G06T 13/00; G06T 15/80; G06T 2210/12; G06T 15/04
See application file for complete search history.

(56) References Cited

U.S. PATENT DOCUMENTS

| | | | |
|---|---|---|---|
| 5,856,829 A * | 1/1999 | Gray, III | G06T 15/10 345/419 |
| 7,978,194 B2 | 7/2011 | Seiler et al. | |
| 2011/0080406 A1* | 4/2011 | Hakura | G06T 15/50 345/426 |

FOREIGN PATENT DOCUMENTS

WO     2012/098365 A1     7/2012

* cited by examiner

*Primary Examiner* — Maurice L McDowell, Jr.
*Assistant Examiner* — Raffi Isanians
(74) *Attorney, Agent, or Firm* — Green, Howard, & Mughal, LLP

(57) ABSTRACT

One or more apparatus and method for multi-pixel/sample level depth testing in a graphics processor is described. In embodiments, a bounding-box of variable size over which a depth test is to be performed is determined based on the pattern of lit pixels or samples within rasterizer tile. A multi-corner depth test may be performed between a source depth data plane and a destination depth plane within a source depth data bound where destination depth data is continuous within the source data bound. A range-based depth test may be performed in response to the destination data being discontinuous. Source depth data prevailing in the depth test may be stored in a compressed plane equation format in response to the source data being continuous within the source data bound, and may be stored as min/max depth data if discontinuous.

19 Claims, 9 Drawing Sheets

FOUR CORNER HIGH PERFORMANCE DEPTH TEST

BACKGROUND

A graphics engine, graphics processing unit (GPU), or visual processing unit (VPU), is a specialized electronic circuit designed to rapidly manipulate and alter memory to accelerate the creation of images in a frame buffer typically intended for output to a display. GPUs may be found in embedded systems, mobile phones, tablets, notebook computers, high performance computation (HPC) servers, and game consoles. In addition to manipulating computer graphics in particular, a highly parallel architecture also enables a GPU to more generally perform processing of large blocks of data in parallel.

In the GPU pipeline front-end, scene geometry is processed into primitives, such as triangles having associated vertex data. In the GPU pipeline back-end, depth and color values are assigned to pixels in screen space. Between the geometry and pixel pipelines is a rasterizer, which maps scene geometry to a pixel array, typically outputting tiles, fragments, or groups of a polygon. Polygons are ordered according to their distance from the viewer to properly project a 3D scene into 2D screen space. This sorting is typically performed with a depth buffer or z-buffer. A depth buffer is a rectangular array built up from the depth values of one or more polygon. The depth (or z-value) of each polygon data group output by the rasterizer may be compared against a z-value stored in a depth buffer associated with the same location or position as the group. If the data group is closer to the viewpoint than the value stored in the depth buffer, it is rendered and the depth buffer is updated with the depth values associated with the newly generated data group. If the group is farther from the viewpoint than the value stored in the depth buffer, it is discarded as occluded. The depth buffer is therefore an array with each location in the array storing depth data of the polygon group that is visible from the viewpoint.

A depth-testing algorithm that is more efficient than another without sacrificing accuracy may advantageously reduce memory bandwidth and pixel-level processing associated with rendering a given scene.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1:
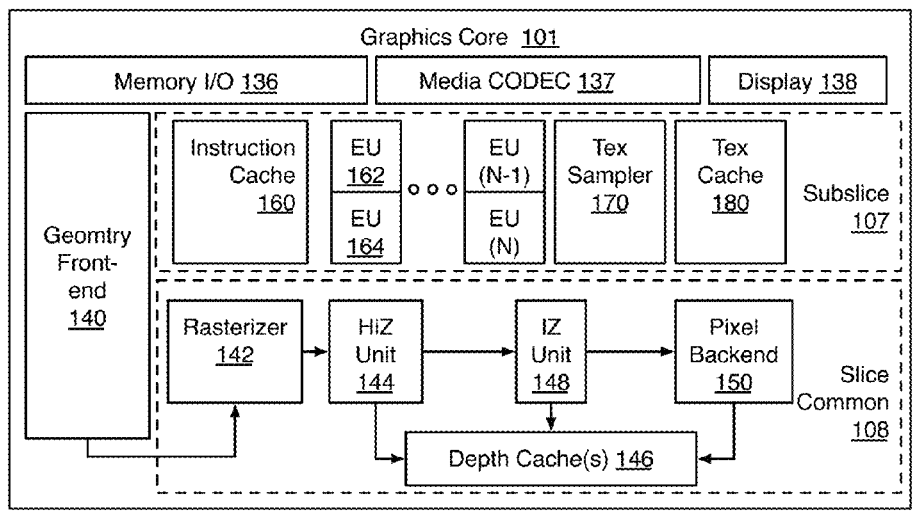
FIG. 1 is a functional block diagram of a graphics processor core employing hierarchical Z hardware to perform at least one of the methods depicted in FIG. 3, or 6, or 8, in accordance with an embodiment.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth various implementations that may be manifested in architectures such system-on-a-chip (SoC) architectures or GPU architectures for example, implementation of the techniques and/or arrangements described herein are not restricted to particular architectures and/or computing systems and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein are implemented in hardware, for example as logic circuitry in a graphics processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, article, and method are described below for depth testing in a graphics processing pipeline. In embodiments, a source data bounding-box of variable size over which a depth test is to be performed is determined based on a pattern of lit pixels or samples within rasterizer tile. In an embodiment, a multi-corner depth test is performed between a source depth data plane and a destination depth plane within a source data bound where destination depth data is continuous within the source data bound. In a further embodiment, a range-based depth test is performed in response to the destination data being discontinuous. In an embodiment, source depth data prevailing in the depth test is stored in a compressed plane equation format in response to the source data being continuous within the source data bound, and is stored as min/max depth data if the source depth data is discontinuous.

FIG. 1 is a functional block diagram of a graphics processor core 101 in accordance with an embodiment employing hierarchical-z (HiZ) hardware to perform at least one of the multi-pixel/sample level depth testing methods described herein. As shown in FIG. 1, graphics processor core 101 includes a memory I/O 136, media encoder/decoder 137, and display pipeline hardware 138. The geometry front-end logic circuitry 130 is coupled to rasterizer 120. Front-end logic circuitry 140 may include for example, a command streamer, vertex shader, hull shader, tesselator, geometry shader, and polygon setup. In the particular architecture illustrated in FIG. 1, rasterizer 142 is part of slice common 108, which includes other fixed-function and/or programmable logic circuitry configured to perform graphics pipeline processing operations downstream of the rasterizer. Logic circuitry in slice common 108 may be coupled in a scalable manner to logic circuitry of one or more subslice 107. Subslice 107 is also responsible for processing tasks within the graphics pipeline and further includes instruction cache 160, a plurality of execution units (EU) 162, 164, etc., texture sampler 170 and texture cache 180 also. Each EU generally has one or more single-instruction-multiple-data (SIMD) machine and a number of vector arithmetic logic units (ALU). Texture sampler 170 performs texture processing, for example mapping between a texel space and a pixel space with sampling and filtering functions designed to avoid frequency dependent artifacts, etc.

Figure 2:
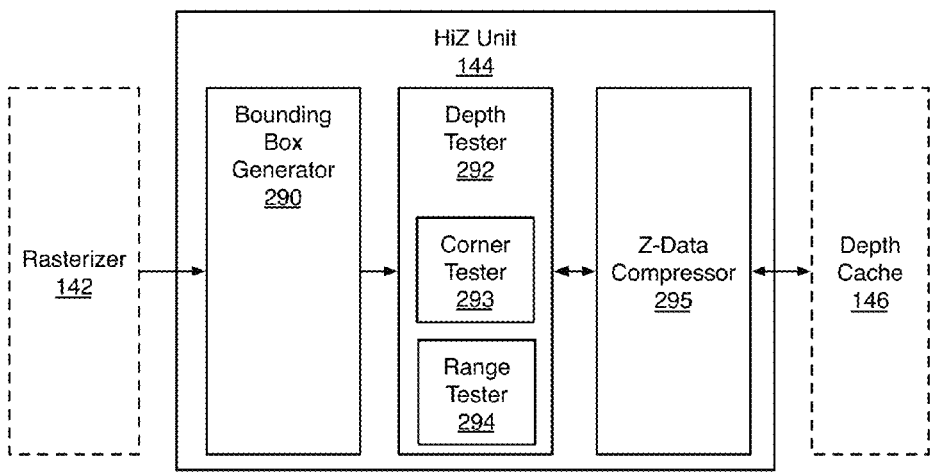
FIG. 2 is a functional block diagram of the hierarchical Z unit illustrated in FIG. 8A, in accordance with an embodiment.

In slice common 108, an output of rasterizer 142 is coupled to an input of HiZ unit 144. HiZ unit 144 is further coupled an intermediate-z (IZ) unit 148 and the pixel backend 150, all of which are coupled to depth cache(s) 146. In embodiments, HiZ unit 144 includes logic circuitry to perform one or more of the multi-pixel/sample depth testing operations described further elsewhere herein. FIG. 2 is a functional block diagram of HiZ unit 144, in accordance with an exemplary embodiment. As shown, HiZ unit 144 includes a source data bounding-box generator 290 having logic circuitry with an input coupled to rasterizer 142. HiZ unit 144 includes a depth tester 292 having logic circuitry with an input coupled to an output of bounding-box generator 290. The logic circuitry of depth tester 292 further includes a corner tester 293 and a depth range tester 294. HiZ unit 144 includes a z-data compressor 295 having logic circuitry with an input coupled to an output of corner depth tester 292. Compressed depth buffer output from the z-data compressor 295 is coupled to an input of depth cache(s) 146.

The exemplary architecture shown in FIG. 2, HiZ unit 244 takes advantage of the continuous nature of the depth data as the depth values (z-values) often belong to the same 3D plane. In exemplary embodiments described further below, corner depth tester 293 is to perform a multi-corner depth test, which compares a depth value determined from a source data plane equation at each of at least three corners of the source data bound to depth values determined for positions within a destination plane equation that correspond to those corners. In one advantageous embodiment, the multi-corner depth test is a four-corner depth test as further described below. Where a multi-corner depth test is not utilized, range tester 294 performs a comparison of depth ranges. In further embodiments also described below, bounding-box generator 290 is to determine a bounding-box of variable size over which a depth test, such as a four-corner depth test, is to be performed. In further embodiments described below, z-data compressor 295 is to write depth data representations to a depth buffer (e.g., provided in depth cache 146) based on a result of the depth test. In advantageous embodiments, z-data compressor 295 outputs depth data representations having at least one compressed format, for example based on a plane equation, associated with the data group prevailing in a depth test, such as a four-corner depth test.

Notably, the logic circuitry units illustrated in FIG. 2, and their functional equivalents, are not necessary in all embodiments described herein. For example, in alternative embodiments, HiZ unit 144 includes bounding-box generator 290, but lacks four-corner depth tester 292; or HiZ unit 244 includes four-corner depth tester 292, but lacks bounding-box generator 290; or HiZ unit 144 includes four-corner depth tester 292 and bounding-box generator 290, but lacks z-data compressor 295; or HiZ unit 144 includes four-corner depth tester 292 and z-data compressor 295, but lacks bounding-box generator 290; or HiZ unit 144 includes bounding-box generator 290 and z-data compressor 295, but lacks four-corner depth tester 292. Other configurations of HiZ unit 144 will also be understood to be possible based the following description of the logic circuitry function and architecture. Furthermore, one or more of the functions of the HiZ unit 144 may be performed within a graphics processing software stack, implemented for example with one or more of API functions, kernel operations, or as user-functions executing in the application space.

Figure 3:
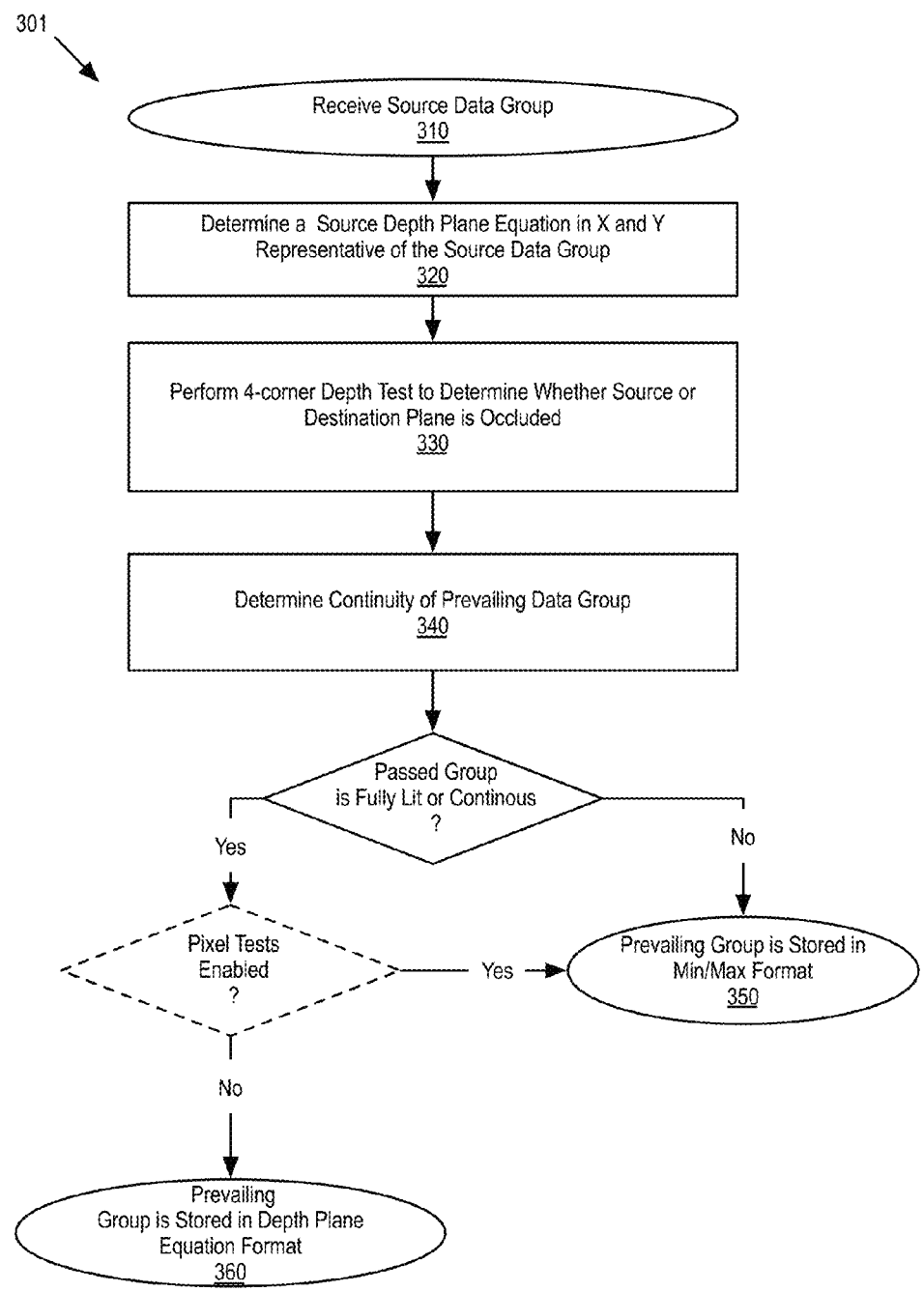
FIG. 3 is a flow diagram illustrating a four-corner depth testing method, in accordance with an embodiment.
Figure 4:
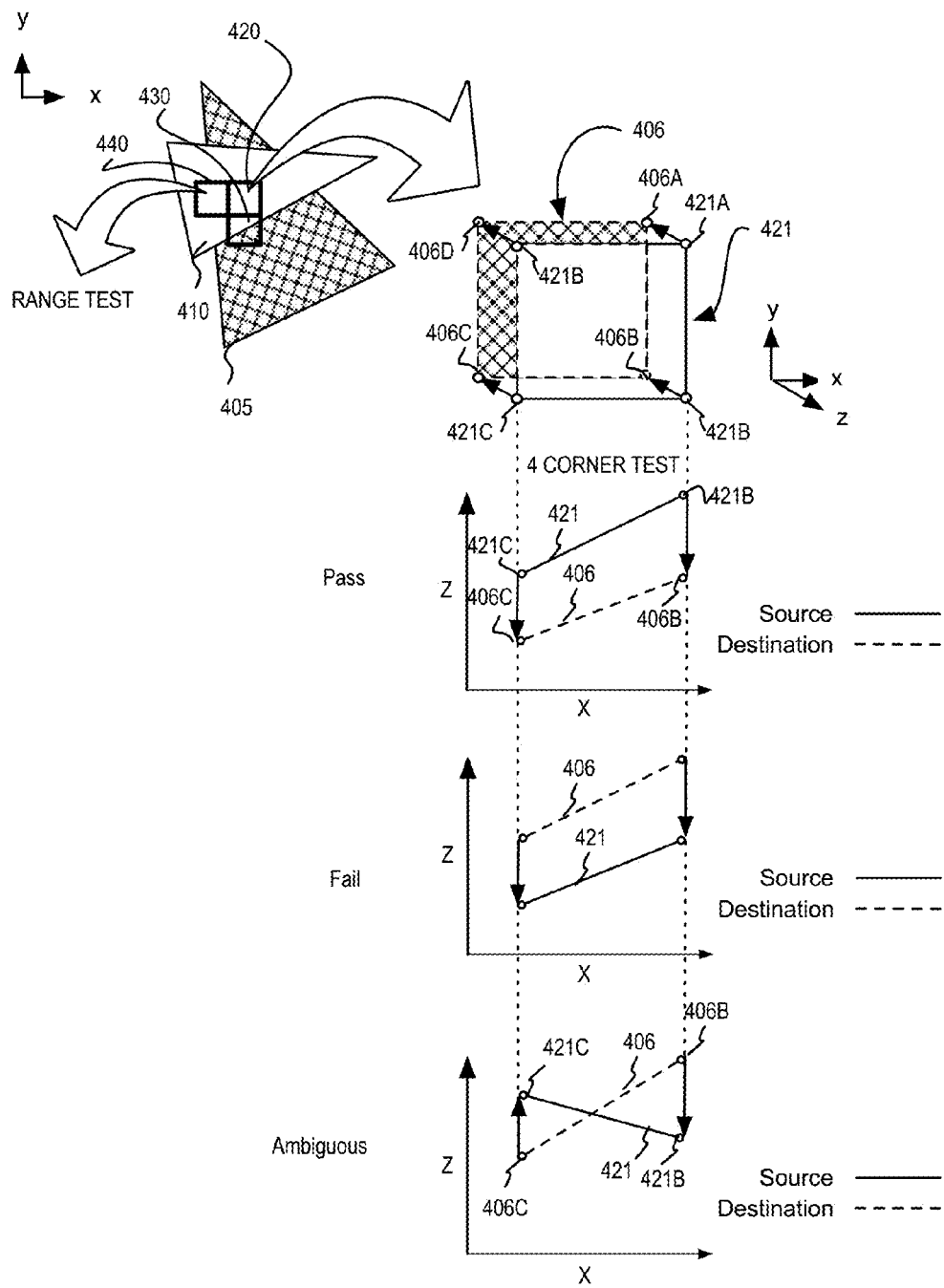
FIG. 4 is a schematic illustrating depth testing polygon data groups with the method illustrated in FIG. 3, in accordance with an embodiment.

FIG. 3 is a flow diagram illustrating a four-corner depth testing method 301, in accordance with an embodiment. In method 301, source depth data associated with the source data group is to be tested against depth data stored in the depth buffer, referred to herein as "destination" depth data. FIG. 4 is a schematic illustrating depth testing of exemplary polygon data groups using the method illustrated in FIG. 3, in accordance with an embodiment.

Referring first to FIG. 3, method 301 begins with receiving a source data group or tile at operation 310. The source data group is received from a rasterizer upstream in the graphics pipeline. The source data group is associated with an x,y address and is of a known size. Embodiments herein are not limited with respect to the size of the source data group, which may be dependent on a rasterization rate, etc. In one exemplary embodiment the source data group is an 8×8 tile of adjacent pixels (i.e., a 64 pixel square). Within the exemplary xy plane illustrated in FIG. 4, the scene geometry includes a polygon 410 partially occluding polygon 405. In a first embodiment illustrated in FIG. 4, source data group 420 is associated with a 2D array of pixel/sample positions fully lit by polygon 410. In a second embodiment illustrated in FIG. 4, source data group 430 is associated with a 2D array of pixel/sample positions only partially lit by polygon 410. In a third embodiment illustrated in FIG. 4, source data group 440 is associated with a 2D array of pixel/sample positions and is again fully lit by polygon 410. For these three address ranges, a depth buffer contains destination data for corresponding rectangular data groups inclusive of polygon 405. Notably, the destination data corresponding to source data group 420 is fully lit by polygon 405. The destination data corresponding to source data group 430 is fully lit by polygon 405. The destination data corresponding to source data group 440 is only partially lit by polygon 405. Therefore, for each of the first two embodiments depicted in FIG. 4, the depth-buffer data is continuous within the xy bounds of the corresponding source data group. The depth-buffer data for the third embodiment however, is discontinuous within the xy bounds of the source data group 440.

Referring again to FIG. 3, method 301 continues at operation 320 where a rectangular source data group of pixels or samples is represented as a source depth plane equation in terms of x,y position within the source data group. The continuous nature of the z-data (i.e., depth values) is leveraged for efficient storage and depth testing. With points within the rectangular source data group belonging to the same 3D plane, high pixel-level accuracy may be maintained with a compressed representation of the depth values associated with the source data. In the exemplary embodiment, the depth function generated is in the form:

$$Z(x,y) = Z_0 + d_x(x) + d_y(y),\qquad\text{Eq. 1}$$

where $Z_o$ is a reference depth value within the source data group, such as the maximum or minimum depth value of the lit pixels/samples in the source data group. Terms $d_x$, $d_y$ represent the incremental changes in depth for a single pixel step in the x and y direction, respectively, from the x,y location corresponding to the reference depth. With the rectangular dimension of the source data group known, the extent of the depth function $Z(x,y)$ can be determined at each corner of the source data group, whether or not the source data group is fully lit, through interpolation of each lit pixel/sample position. For example, in further reference to FIG. 4, a source depth plane is interpolated to all four corners of the bounded source data group 430 based on those pixels/samples within the group that are lit by polygon 410.

In an embodiment, a four-corner depth test is performed to determine whether the source or destination plane is occluded. In the four-corner testing method 301 (FIG. 3), each corner of the source depth plane generated at operation 320 is compared to a corresponding corner of a destination depth plane stored in the depth buffer. In other words, four pairs of depth values are compared, one pair co-located at each xy corner position of the source depth plane. Depth buffer data may be represented in memory in compressed form as a plane equation just as was described for the source data group whenever the depth-buffer data is continuous within the xy bounds of the source data group being tested. Hence, two plane equations, source and destination, can be compared to determine if the source data group is behind or in front of what is already represented in the depth buffer. In the exemplary embodiment, the source plane equation is evaluated at each of four corners to determine four source depth values. Likewise, the destination plane equation encode is evaluated at each of the four corners to determine four destination depth values. Such processing is performed in parallel in advantageous embodiments. The resulting two sets of four depth values are then compared according to a predetermined depth test function with each corner of the data group yielding a single depth test result.

Embodiments are not limited in with respect to specific corner depth test functions, as they are dependent on whether depth value is defined to increase or decrease with greater distance from the viewpoint, etc. The depth test function may be, for example a "less than test", or a "greater than" test, etc. Referring again to the example illustrated in FIG. 4, source depth plane 420 has source corner depth values of 421A, 421B, 421C, and 421D. A destination plane 406 is evaluated at 406A, 406B, 406C, and 406D. For the depth test, source corner depth value 421A is compared to the destination corner depth value 406A, source corner depth value 421B is compared to the destination corner depth value 406B, source corner depth value 421C is compared to the destination corner depth value 406C, and source corner depth value 421D is compared to the destination corner depth value 406D. The four-corner test may be likewise performed on the source data group 430, using interpolated corner values as needed, and compared to a corresponding destination depth plane. For the source data group 440 however, because the corresponding destination data is discontinuous, the depth test defaults to a range-based test, as described elsewhere herein.

In an embodiment, if the results of the four corner comparisons all agree (e.g., either all four comparisons "pass" or all four comparisons "fail"), all of the pixels/samples in the data group represented by the depth plane are deemed to have that result (e.g., all "pass" or all "fail"). As such, the four-corner depth test 101 may reduce the number of depth tests relative to a pixel-level test by a factor of 4 (e.g., 16 pixels in the source data group/4 depth tests performed), or more. In further reference to the example shown in FIG. 4, where z-value increases with proximity to the viewpoint, and all of the four source corner depth values 421A-421D are larger than the corresponding four destination corner depth values 406A-406D, source depth plane 420 passes the depth test as being closer to the viewpoint. The pixels/samples associated with the source depth plane 421 are retained in the depth buffer as occluding the pixels/samples associated with destination depth plane 406. Alternatively, where all of the four source corner depth values 421A-421D are smaller than the corresponding destination corner depth values 406A-406D, source depth plane 420 fails the depth test, being farther from the viewpoint. The pixels/samples associated with the destination depth plane 406 are retained in the depth buffer as occluding the pixels/samples associated with source depth plane 420.

In a further embodiment, in response to at least one corner depth test having a different result than another, the result of the four-corner test is deemed "ambiguous" and the source data group is passed to a subsequent stage where pixels/samples of the data group are tested individually (e.g., by IZ unit 148 in FIG. 1) to ensure proper depth ordering of the scene. In further reference to the example shown in FIG. 4, not all four of the source corner depth values 421A-421D are larger than the corresponding destination corner depth values 406A-406D. Specifically source corner depth value 421B is smaller than destination corner depth value 406B, indicating at least a portion of source depth plane 421 is occluded by at least a portion of destination depth plane 406. However, because source corner depth value 421C is larger than destination corner depth value 406C, the four-corner test is ambiguous with at least a portion of destination depth plane 406 occluded by at least a portion of source depth plane 421.

In an embodiment where the four-corner depth test is unambiguous, the depth data written to the depth-buffer is of a format that depends on the continuity or fully lit status of the data group that prevails in the four-corner test. As shown in FIG. 3, at operation 340 the lit status of the prevailing data group is determined. In response to the passed data group being only partially lit (i.e., FullyLit=false), at operation 350 the minimum and maximum depth values for the lit pixels/samples of the prevailing group are stored in the depth buffer (either from a prior writing if a destination depth data prevails, or newly written if the prevailing source data is to be an update to the destination). Further depth tests against this section of the image will then continue to default to a range test until this data is overwritten with a plane equation entry representation of a continuous, or fully lit data group.

Figure 5:
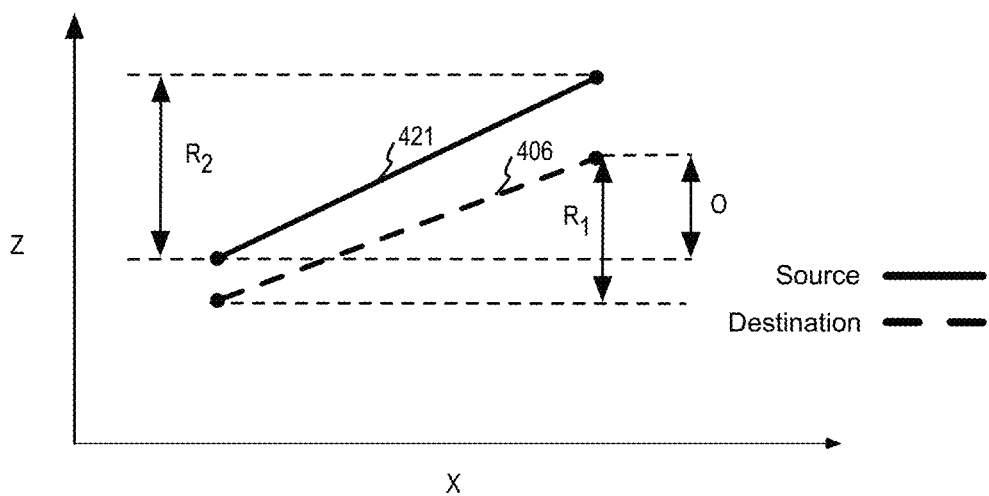
FIG. 5 is a graph illustrating one advantage of four-corner depth testing, in accordance with an embodiment.

For example, in reference to FIG. 4, where the source data group 430 is determined to pass the four-corner test, the maximum depth value and the minimum depth value is stored to the depth buffer because the prevailing data group 430 is not fully lit. In response to the prevailing data group being fully lit (i.e., FullyLit=true), method 301 proceeds toward operation 360 where the source depth plane equation for the prevailing group is stored to the depth buffer (either written as a destination update for a prevailing source or retained as a prevailing destination). In a further embodiment, writing of the prevailing depth plane equation to the depth buffer is additionally predicated on whether a down stream pixel test (e.g., alpha test, alpha to coverage, etc.) is enabled. In response to an enabled down stream pixel test, the maximum depth value and the minimum depth value is written to the depth buffer at operation 150.

Where a depth plane equation is written to the depth buffer, the depth data for the pixel/sample group is in a compressed format because it is possible to store $d_x$ and $d_y$ in fewer bits than is required for any one pixel depth value (typically having at least 24 bits). The depth storage requirements are therefore reduced relative to storing a depth value for each pixel within the xy bounds of the data group. The plane equation format is also less lossy than is storage of depth range, leading to better accuracy, in a subsequent depth test for example. FIG. 5 is a graph illustrating an advantage of four-corner depth testing, in accordance with an embodiment. As shown in FIG. 5, destination depth plane 406 has a first range $R_1$ and source depth plane 421 has a second range $R_2$, which overlaps $R_1$ in absolute z by overlap O. Whereas a range test would not be able to resolve such a circumstance, the four-corner depth testing method 301 will correctly resolve cases where two planes overlap in absolute z but do not actually intersect with each other. Indeed, the four-corner depth test can unambiguously resolve all possible geometrical arrangements where the source and destination planes don't interact.

In an embodiment, a depth-test bounding-box is sized dynamically based on the pattern of lit pixels/samples within a group. A depth-test bounding-box defines the maximum data group size represented as a unit (e.g., a continuous plane) in a group-level depth test (e.g., performed by HiZ unit 144 in FIG. 1). Dynamic bounding-box sizing may be performed by fixed function logic circuitry represented as bounding-box generator 290 in FIG. 2. Dynamically determining the depth-test bounding-box has the advantage of greater depth test efficiency by improving the likelihood the depth test (e.g., four-corner test, range test, etc.) will yield an unambiguous result. For embodiments where the depth test performed on the data group within the bounding-box is the four-corner test described above, it is advantageous to determine the corner values as close to the nearest lit pixel as possible for the greatest probability that all the source data group corners will be above or below the destination data values for an unambiguous depth test result. In the exemplary embodiment, a depth-test bounding-box is determined based on the source pixel/sample mask. In one such embodiment, the smallest possible bounding rectangle that contains all lit pixels/samples within one source data group is determined.

Figure 6:
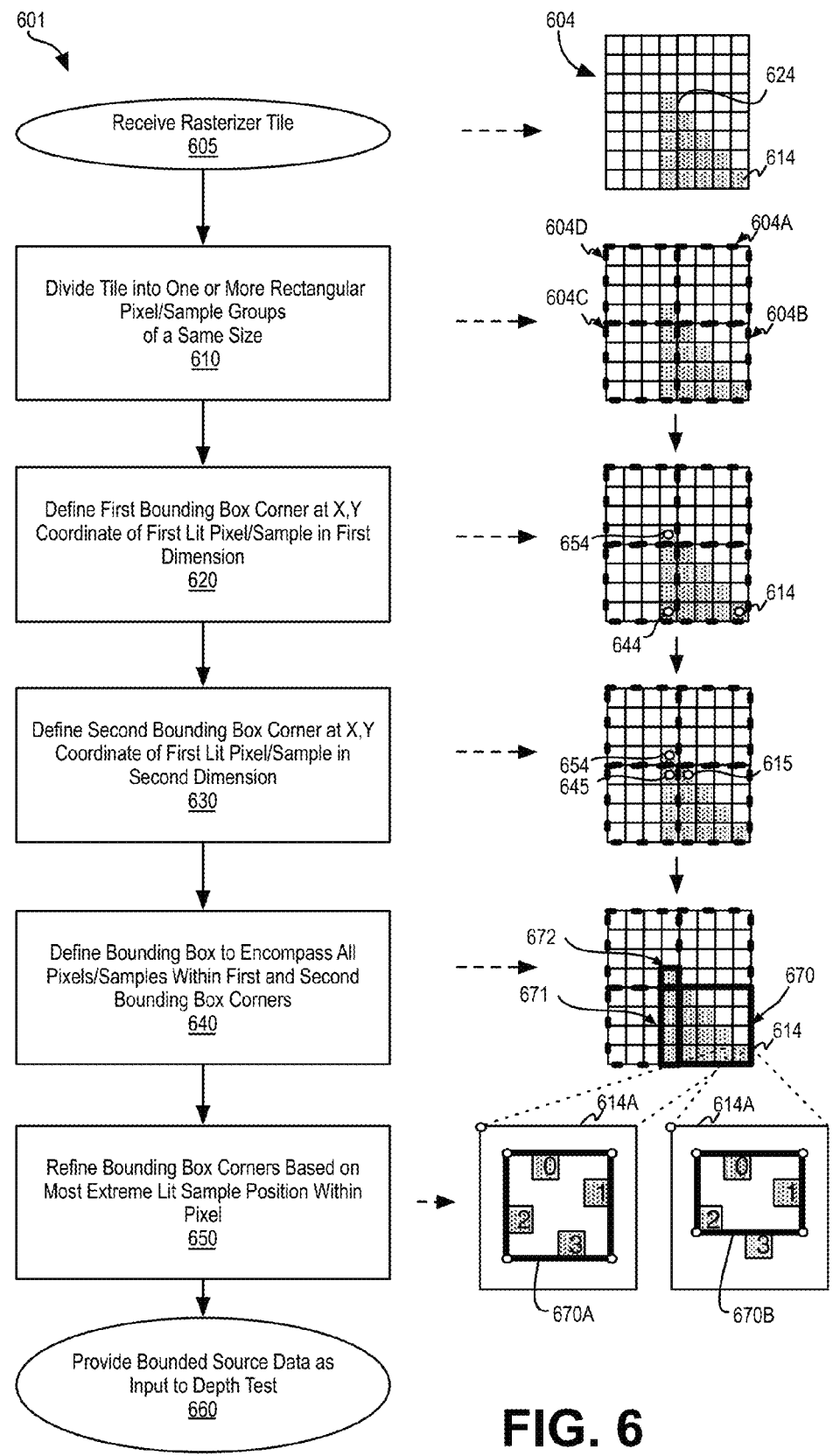
FIG. 6 is a flow diagram illustrating a method of determining a variable depth-test bounding-box of minimum size, in accordance with an embodiment.

FIG. 6 is a flow diagram illustrating a method 601 for determining a depth-test bounding-box of minimum size, in accordance with an embodiment. Method 601 begins at operation 603 with receiving a rasterizer tile 604. In this example, tile 604 includes an 8×8 array of samples/pixels. Pixel/sample 614 is lit and pixel/sample 624 is unlit. Although the 8×8 dimension of tile 604 is advantageous in method 601, alternative embodiments with tiles of differing size or also possible. Method 601 continues at operation 610, where the rasterizer tile is divided down into source data groups of all the same size. The number of pixel/sample source data groups identified at operation 610 may depend on the size of the source data group received at operation 605. Functionally, the size of the pixel/sample source data group defines the maximum size of a bounding-box over which one depth test will be performed. The exemplary 8×8 tile 604 is divided into 4×4 pixels/sample quadrants 604A, 604B, 604C, and 604D. For each pixel/sample source data group (e.g., 604A), one depth test (e.g., a four-corner depth test) is to be performed if any pixel/sample is lit. In advantageous embodiments therefore, a bounding-box of variable size is calculated for each of the source data groups 604A-604D.

At operation 620, a first bounding-box corner is set to the xy coordinate of a first lit pixel/sample in a first dimension. In hardware this may be performed with the pixel/samples of one source data group (e.g., 604B) aligned to an xy coordinate system. Beginning at a first corner xy position of the source data group, the xy coordinate of the first lit pixel (e.g., 614) is determined, for example with a priority encoder that prioritizes on the basis of the first dimension (e.g., x) to identify a maximum (or minimum) x value of the lit pixels/samples at the minimum (or maximum) y. The same algorithm is applied (in parallel) to the other source data groups. As shown in FIG. 6, pixel/sample 644 is identified as the first lit pixel/sample in the x dimension of minimum y for source data group 604C, pixel/sample 654 is identified as the first lit pixel/sample in the x dimension of minimum y for source data group 604D, and no pixel/sample is lit in source data group 604A.

At operation 630, a second bounding-box corner is set to the xy coordinate of a first lit pixel/sample in the second dimension farthest from the lit pixel determined at operation 620. Beginning at a second corner xy position of the source data group, the xy coordinate of the first lit pixel (e.g., 615) is determined, for example with a priority encoding algorithm that prioritizes on the basis of the second dimension (e.g., y) to identify a maximum (or minimum) y value of the lit pixels/samples at the minimum (or maximum) x. The same algorithm is applied (in parallel) to the other source data groups. As shown in FIG. 6, pixel/sample 645 is identified as the first lit pixel/sample in they dimension of minimum x for source data group 604C, pixel/sample 654 is identified as the first lit pixel/sample in the y dimension of minimum x for source data group 604D. At operation 640, the bounding-box is set to encompass all source data within the rectangle encompassing the first and second bounding-box corners determined at operations 620, 630. As shown in FIG. 6, bounding-box 670 is the smallest rectangular unit that includes all lit pixels of source group 604B and is the full size of the source data group 640B (4×4 pixels/samples). Bounding-box 671 is the smallest rectangular unit including all lit pixels of source group 640B and is only a 1×4 group of pixels. Bounding-box 672 is reduced in size to a one pixel/sample such that only one depth test is needed to properly rank the depth of the source group 604D, and in the most trivial case no depth test is performed (or a default is performed) for source group 640A.

In embodiments, bounding-box corner position calculations are refined based on sub-pixel sampling positions. In an advantageous embodiment where each pixel is composed of multiple samples, a depth-test bounding-box is sized based on the most extreme sample position with respect to the bounding-box corner being calculated. For a bounding-box corner position of minimum y and maximum x, the position may be refined to reduce the size of bounding-box by less than a pixel to include only the lit sub-pixel sample positions of minimum y and maximum x within the first corner pixel. Similarly, for a bounding-box corner position of maximum y and minimum x, position may be refined to reduce the size of the bounding-box by less than a pixel to include only the lit sub-pixel sample positions of maximum y and minimum x within the second corner pixel. FIG. 6 further illustrates an exemplary 4×MSAA sub-pixel sampling mode where sub-samples 0, 1, 2, and 3 are spatially arranged within the pixel/sample 614. As shown, a bounding-box 670B is reduced in size relative to bounding-box 670A when sub-sample 3 is not lit. In alternative embodiments, sub-pixel sampling positions are ignored, and bounding-box corner positions are determined with pixels considered an atomic unit and completely encompassed by the bounding-box.

Method 601 ends at operation 660 where the bounded source data is provided for a single group-level depth test (e.g., one four-corner depth test, one range test, etc.). In the exemplary embodiment, the bounded source data from method 601 is output from bounding box generator 290 (FIG. 2) to four-corner tester 293, which performs the four-corner test method 301 (FIG. 3). The depth tests for a given rasterizer tile are advantageously performed in parallel with all other pixel/sample source data groups determined for that tile. For example, four-corner depth tests for each of source data groups 604B, 604C, and 604D (i.e., all quadrants having a lit pixel/sample) are performed in parallel with the source data tested for each group limited to the corresponding bounding box. Hence, a source depth plane equation may be generated for each of the source data groups, and as described above in reference to FIG. 3, compared to a destination plane corresponding to the same location.

Figure 7:
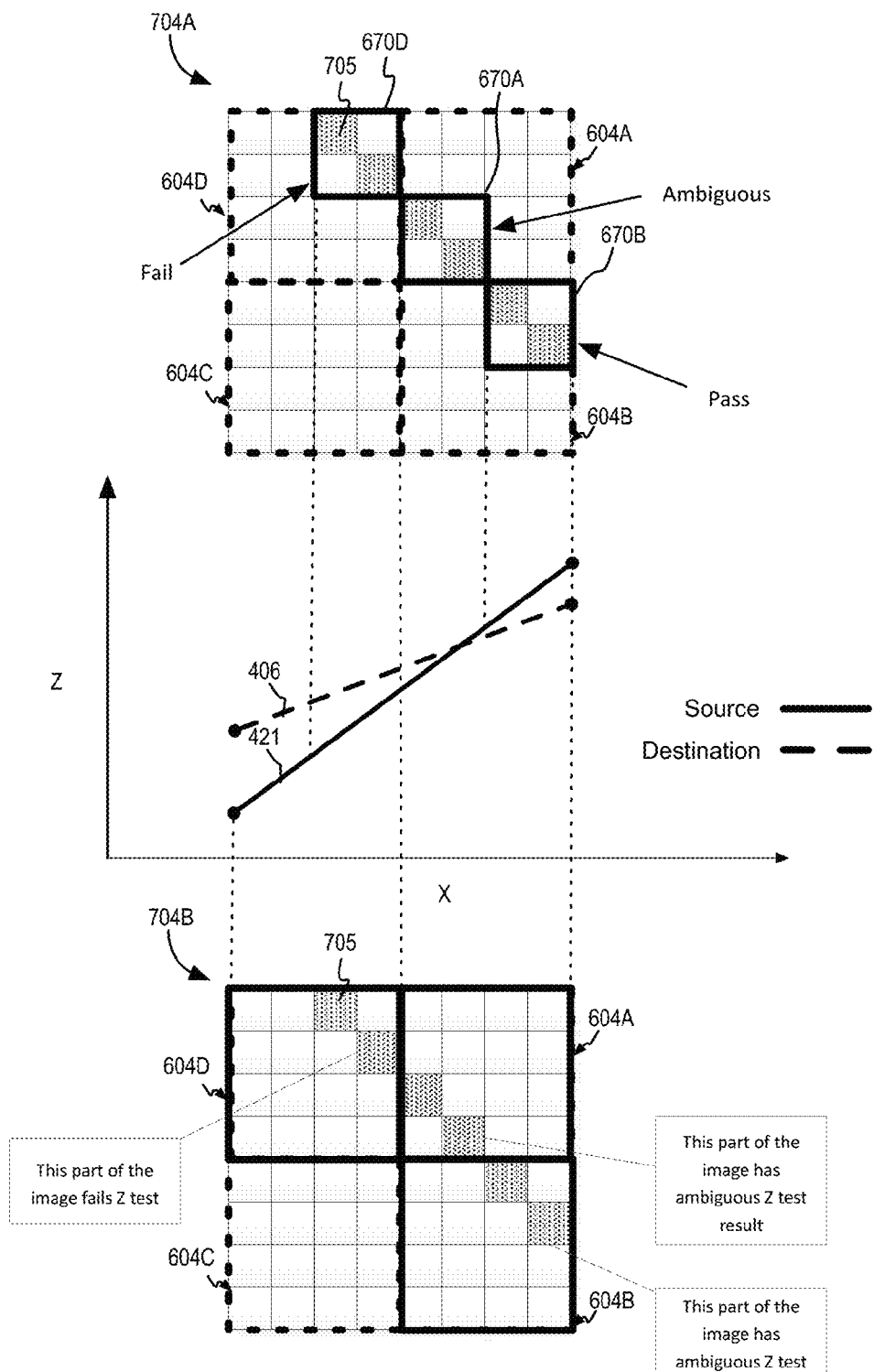
FIG. 7 is a graph illustrating an advantage of four-corner depth testing with a variable source data bounding-box, in accordance with an embodiment.
Figure 8:
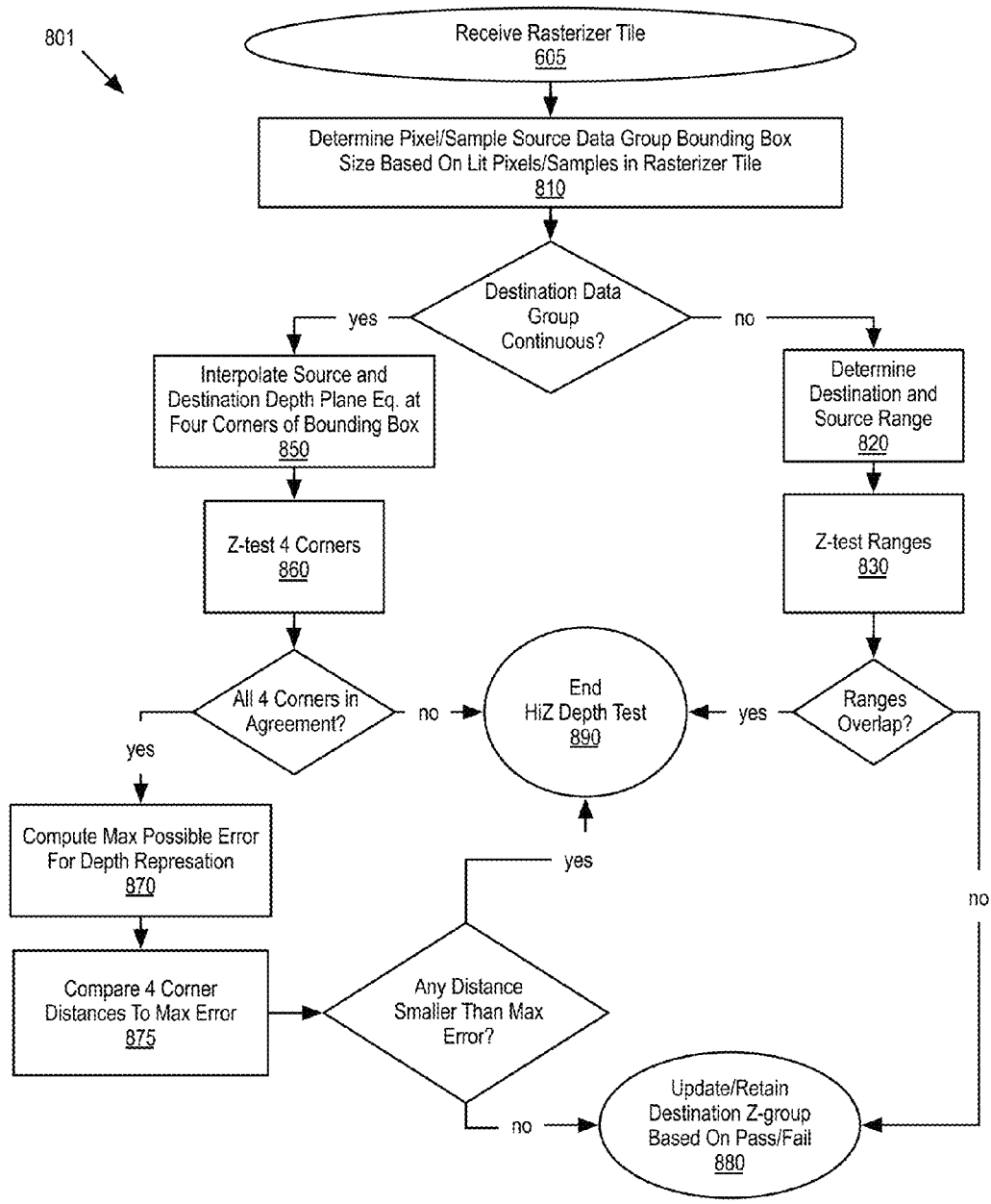
FIG. 8 is a flow diagram illustrating a depth testing method, in accordance with an embodiment.

As noted above, dynamic sizing of the depth-test bounding box increases the probability that a depth test, such as the four-corner depth test, will generate an unambiguous result and thereby avoid subsequent pixel-level testing for all pixels within the bounding box. FIG. 7 is a graph illustrating an advantage of four-corner depth testing with a variable depth-test bounding-box, in accordance with an embodiment. As illustrated, source depth plane 421 intersects destination depth plane 406. Lit pixels 705 on source depth plane 421 are included within 8×8 rasterizer tile 704A. The lit pixels 705 on source depth plane 421 are also illustrated within 8×8 rasterizer tile 704B. Both tiles 704A, 704B are divided into the quadrants of source data groups 604A, 604B, 604C, and 604D. For depth testing of rasterizer tile 704A, bounding-box calculations are enabled, and a depth-test bounding-box size minimization method is performed. For example method 601 described above is performed to determine up to four variable depth-test bounding-boxes of minimum size. In contrast, for depth testing of rasterizer tile 705, bounding-box calculations are disabled, and no bounding-box size minimization method is performed.

For rasterizer tile 704A, the depth-test bounding-box size minimization method determines three bounding boxes 670A, 670B, and 670D for each of source data groups 604A, 604B, 604C, and 604D containing a lit pixel/sample. A four-corner depth test is then performed on each of the source data groups 604A, 604B, 604D. Following the four-corner testing method 301, a depth plane equation is determined for each of source data groups 604A, 604B, 604D. Assuming destination plane 406 is continuous within each of the bounding boxes 670A, 670B, 670D, destination depth data is also represented by corresponding plane equations. The source and destination planes 421, 406 are evaluated at all of the corners of the bounding boxes 670A, 670B, 670D as three independent four-corner tests generating one "pass" result, one "fail" result, and one "ambiguous" result.

For rasterizer tile 704B, a four-corner depth test is similarly performed on each of the source data groups 604A, 604B, 604C, and 604D containing a lit pixel/sample. In this case however, because of the larger bounding box size, three independent four-corner tests generate one "pass" result and two "ambiguous" results. Hence, source data bounding-box size minimization improves the resolving power of the four-corner depth test.

In an embodiment, the depth test performed on a source data group is dependent on destination data continuity over the extent of a given source data bound. FIG. 6 is a flow diagram illustrating a multi-mode hierarchal depth testing method 801 incorporating depth-test bounding-box minimization as well as a four-corner depth testing and range depth testing, in accordance with one exemplary embodiment. In a further embodiment, method 801 is performed by HiZ unit 144 (FIG. 1).

HiZ method 801 begins with operation 605 where the rasterizer tile is received as described above. At operation 810 one or more depth-test bounding-box of minimum size is determined for the rasterizer tile based on the lit pixels/samples in the tile. In the exemplary embodiment, the method 601 is performed at operation 810 to generate at least one source data group bounding-box from the rasterizer tile. In a further embodiment, bounding box generator 290 (FIG. 2) performs method 601 at operation 810. Where an 8×8 pixel/sample array is output from the rasterizer, at least one source data group of no more and 4×4 pixels/sample is determined at operation 810. In a further embodiment, at least one source data group of less than 4×4 pixel/sample is determined from an 8×8 pixel/sample array.

Recalling that method 301 may end with storage of either a range or a plane representation of a prevailing data group, depth data which stored in the depth-buffer for a given xy dimension may either be in range format or in plane equation format. A four-corner test is applicable to those circumstances where the destination data is represented by a plane equation from which four corner depth values may be determined. Therefore, a four-corner test is performed in method 801 on each source data group bounded at operation 810 where the destination data group is continuous within the extent of the depth test bounding-box determined at operation 810.

In a first embodiment where destination data is discontinuous within a source data group bound (e.g., as would be the case for source data group 440 in FIG. 4), method 801 defaults to a depth range test (e.g. performed by range tester 294 in FIG. 2). A depth range test entails a single range test instead of multiple corner tests, and as previously discussed in the context of FIG. 5 is less accurate than a four-corner test. The destination and source depth ranges are determined (in parallel) and any method may be enlisted at operation 820 as embodiments are not limited in this respect. The destination depth range is then compared to the source depth range at operation 830. Where the source depth range overlaps with the destination range, the range test result is ambiguous and HiZ method 801 ends at operation 890. The source data group may then be passed on to a subsequent stage (e.g., IZ unit 148 in FIG. 1), where an individual pixel/sample depth test is performed on each pixel with the source data group. In the event the ranges do not overlap, method 801 completes at operation 880 where the depth information associated with the destination data group is either retained or updated with that of the source data group, based on the unambiguous pass/fail results determined at operation 830.

In a second embodiment where destination data is continuous within a source data group bound, method 801 proceeds to operation 850 where source and destination depth plane equations are interpolated at the four corners of each source data bounding box that was determined at operation 810. At operation 860, the four corner depth values are tested as was described above to determine if all corners for one source data group agree on a "pass" or "fail" result. In the exemplary embodiment, four-corner tester 292 (FIG. 2) performs operation 860. If not all corners are in agreement, resulting in an ambiguous depth test result, HiZ method 801 ends at operation 890. The source data group may then be passed on to a subsequent stage (e.g., IZ unit 148 in FIG. 1), where an individual pixel/sample depth test is performed on each pixel within the source data group. In response to all corners being in agreement, method 801 proceeds toward operation 880 where the depth information associated with the destination data group is either retained or updated with that of the source data group, based on the unambiguous pass/fail results determined at operation 860.

Figure 9:
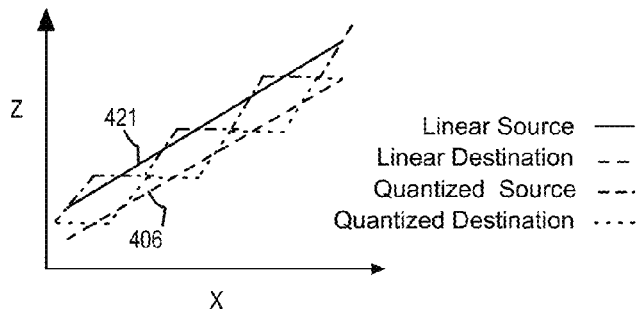
FIG. 9 is a graph illustrating quantization error in depth testing, in accordance with an embodiment.

In a further embodiment, method 801 additionally includes a quantization error check as a test of the validity of the four-corner test at operation 860. FIG. 9 is a graph illustrating quantization error, in accordance with an embodiment where the maximum quantization error is approximately equal to the distance between the source and depth planes 421, 406. In this case, the four-corner depth test would be unambiguous (e.g., a pass result) because the planes do not intersect. Confidence in the test is relatively low however because of the extreme depth overlap of the plane equations. In further reference to the plane equation provided above, $d_x$ and $d_y$ are determined from depth values that may be integer approximations to the exact depths at the corners. The further the tile corners are from the lit source pixels/samples, the more the corner values may deviate from the plane equation.

In an exemplary quantization error check embodiment, the maximum possible quantization error associated with representing depth values as a linear depth plane equation is determined at operation 870. This maximum possible error is a function of the precision with which the depth value is represented (e.g., as a 16 bit unsigned, 24 bit, or 32 bit floating point, etc.). At operation 875, at least the minimum distance between the corner positions is compared to the maximum quantization error determined at operation 870. If the minimum distance is not predetermined, the maximum quantization error may directly compared to each of the corner distances between the depth value pairs of the four corresponding corners. For embodiments where the distance between source and destination plane at any of the four corners is less than the maximum quantization error, the four-corner test is deemed ambiguous and method 801 ends at operation 890. For embodiments where the distance between source and destination plane at all of the four corners is greater than the maximum quantization error, the four-corner test is deemed valid. Method 801 then proceeds to operation 880 based on the four-corner depth test result determined at operation 860.

Figure 10:
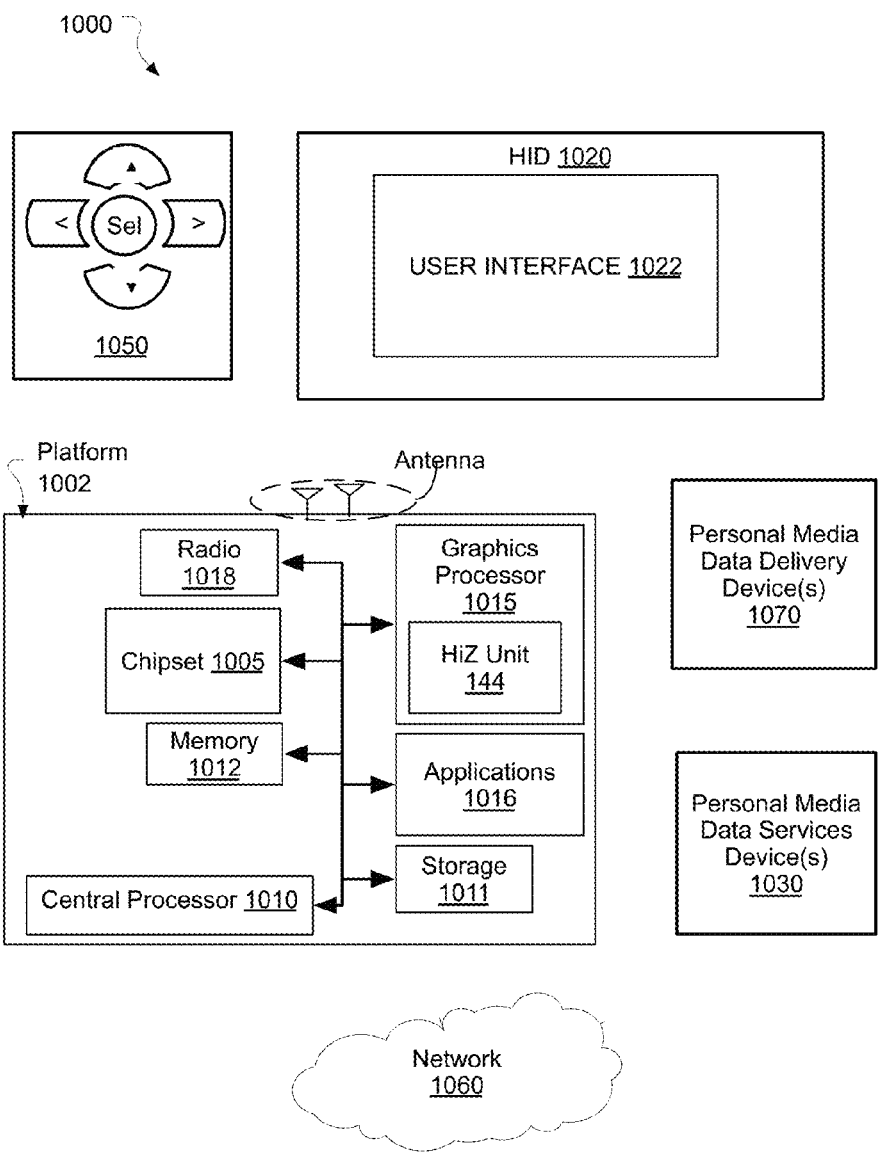
FIG. 10 is an illustrative diagram of an exemplary system, in accordance with an embodiment.

FIG. 10 is an illustrative diagram of an exemplary system 1000, in accordance with embodiments. System 1000 may implement all or a subset of the various functional blocks depicted in FIG. 2. For example, in one embodiment a graphics processor 1015 includes the HiZ unit 144 described elsewhere herein. System 1000 may be a mobile device although system 1000 is not limited to this context. For example, system 1000 may be incorporated into a laptop computer, ultra-laptop computer, tablet, touch pad, portable computer, handheld computer, palmtop computer, cellular telephone, smart device (e.g., smart phone, smart tablet or mobile television), mobile internet device (MID), messaging device, data communication device, and so forth. System 1000 may also be an infrastructure device. For example, system 1000 may be incorporated into a large format television, set-top box, desktop computer, or other home or commercial network device.

In various implementations, system 1000 includes a platform 1002 coupled to a HID 1020. Platform 1002 may receive captured personal media data from a personal media data services device(s) 1030, a personal media data delivery device(s) 1040, or other similar content source. A navigation controller 1050 including one or more navigation features may be used to interact with, for example, platform 1002 and/or HID 1020. Each of these components is described in greater detail below.

In various implementations, platform 1002 may include any combination of a chipset 1005, processor 1010, memory 1012, storage 1014, graphics processor 1015, applications 1016 and/or radio 1018. Chipset 1005 may provide intercommunication among processor 1010, memory 1012, storage 1014, graphics processor 1015, applications 1016, or radio 1018. For example, chipset 1005 may include a storage adapter (not depicted) capable of providing intercommunication with storage 1014.

Processor 1010 may be implemented as one or more Complex Instruction Set Computer (CISC) or Reduced Instruction Set Computer (RISC) processors; x86 instruction set compatible processors, multi-core, or any other microprocessor or central processing unit (CPU). In various implementations, processor 1010 may be a multi-core processor(s), multi-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics processor 1015 may perform processing of images such as still or video media data for display, or perform general computing functions in a highly parallel manner. Graphics processor 1015 may include one or more GPU, or visual processing unit (VPU), for example. An analog or digital interface may be used to communicatively couple graphics processor 1015 and display 1020. For example, the interface may be any of a High-Definition Multimedia Interface, Display Port, wireless HDMI, and/or wireless HD compliant techniques. Graphics processor 1015 may be integrated with central processor 1010 onto a single chip (i.e., SoC) as a graphics core or provided as part of chipset 1005. In some implementations, graphics processor 1015 may be a stand-alone card communicatively coupled to chipset 1005. In various exemplary embodiments, graphics processor 1015 and/or central processor 1010 invokes or otherwise implements processes and/or multi-pixel depth test methods utilizing a four-corner test and/or a variable depth-test bounding box determination, for example as described elsewhere herein.

The depth testing techniques described herein may be implemented in various hardware architectures, cell designs, or "IP cores." As still another embodiment, the methods and functions described herein in the context of graphics processor may be extended to a general-purpose processor, including a multi-core processor. In further embodiments, the methods and functions may be implemented in a purpose-built consumer electronics device, such as a game console processor.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, HID 1020 may include any television type monitor or display. HID 1020 may include, for example, a computer display screen, touch screen display, video monitor, television-like device, and/or a television. HID 1020 may be digital and/or analog. In various implementations, HID 1020 may be a holographic display. Also, HID 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on HID 1020.

In various implementations, personal media services device(s) 1030 may be hosted by any national, international and/or independent service and thus accessible to platform 1002 via the Internet, for example. Personal media services device(s) 1030 may be coupled to platform 1002 and/or to display 1020. Platform 1002 and/or personal services device (s) 1030 may be coupled to a network 1060 to communicate (e.g., send and/or receive) media information to and from network 1060. Personal media delivery device(s) 1040 also may be coupled to platform 1002 and/or to HID 1020.

In various implementations, personal media data services device(s) 1030 may include a cable television box, personal computer, network, telephone, Internet enabled devices or appliance capable of delivering digital information and/or content, and any other similar device capable of unidirectionally or bidirectionally communicating content between a media data provider and platform 1002, via network 1060 or directly. It will be appreciated that the content may be communicated unidirectionally and/or bidirectionally to and from any one of the components in system 1000 and a provider via network 1060. Examples of personal media include any captured media information including, for example, video, music, medical and gaming information, and so forth.

Personal media data services device(s) 1030 may receive content including media information with examples of content providers including any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., HID 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In embodiments, controller 1050 may not be a separate component but may be integrated into platform 1002 and/or HID 1020. The present disclosure, however, is not limited to the elements or in the context shown or described herein.

In various implementations, program logic may allow platform 1002 to stream content to media adaptors or other personal media services device(s) 1030 or personal media delivery device(s) 1040 even when the platform is turned "off." In addition, chipset 1005 may include hardware and/or software support for 8.1 surround sound audio and/or high definition (7.1) surround sound audio, for example. Drivers may include a graphics driver for integrated graphics platforms.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 11:
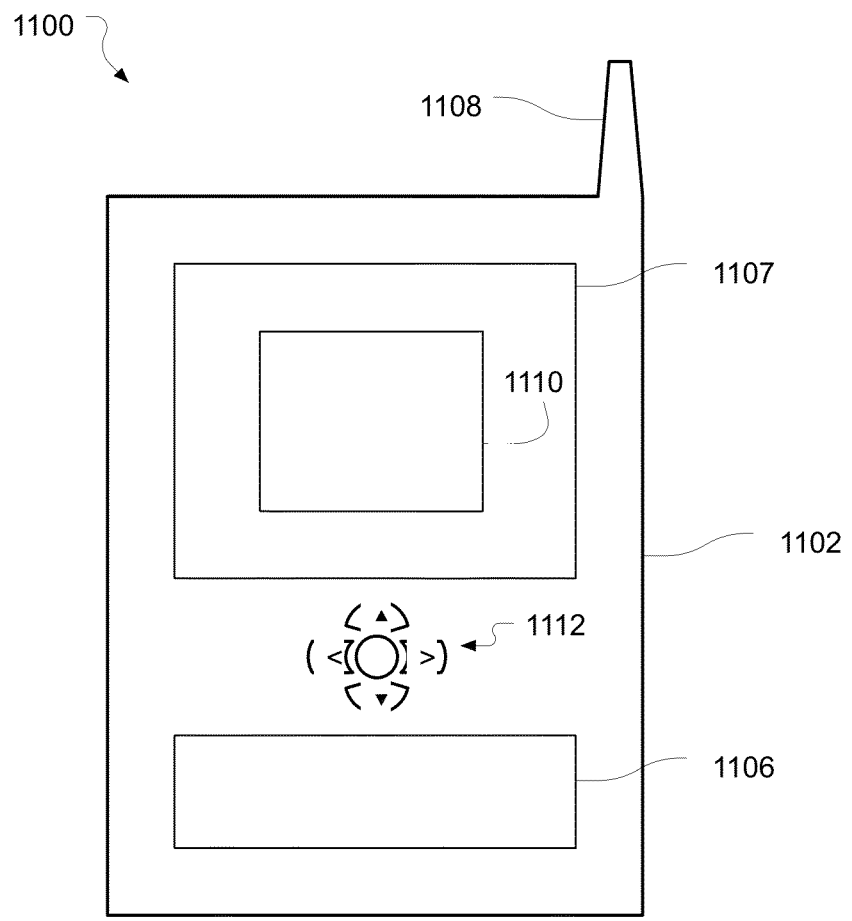
FIG. 11 is an illustrative diagram of an exemplary system, arranged in accordance with an embodiment.

As described above, system 1000 may be embodied in varying physical styles or form factors. FIG. 11 illustrates embodiments of a small form factor device 1100 in which system 1000 may be embodied. In embodiments, for example, device 1100 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth.

Examples of a mobile computing device also may include computers configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing 1102, a display 1104, an input/output (I/O) device 1106, and an antenna 1108. Device 1100 also may include navigation features 1112. Display 1104 may include any suitable display unit for displaying information appropriate for a mobile computing device. I/O device 1206 may include any suitable I/O device for entering information into a mobile computing device. Examples for I/O device 1106 may include an alphanumeric keyboard, a numeric keypad, a touch pad, input keys, buttons, switches, rocker switches, microphones, speakers, voice recognition device and software, and so forth. Information also may be entered into device 1100 by way of microphone (not shown), or may be digitized by a voice recognition device. Embodiments are not limited in this context.

Various embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following examples pertain to particular exemplary embodiments.

In one or more first embodiment, a graphics processor includes a rasterizer to output a rasterizer tile comprising a first plurality of pixels or samples. A depth testing unit including logic circuitry coupled to an output of the rasterizer is to receive a source data group bounded within the rasterizer tile. The depth testing unit further includes interpolation logic circuitry to determine a source depth plane equation representative of the source data group. The depth testing unit further includes corner depth test logic circuitry to compare source depth data with destination depth data. The source depth data is determined from evaluations of the source depth plane equation at each of four corners of the source data group bound, and the destination depth data is determined for positions in a destination depth plane corresponding to the four corners.

In furtherance of the one or more first embodiment, the depth testing unit further includes a bounding-box generator including logic circuitry coupled to an output of the rasterizer to determine from the rasterizer tile a bounding-box of variable size defining the source data group bound over which the depth test is to be performed.

In furtherance of the one or more first embodiment, the bounding-box generator is to determine the smallest rectangular grouping of samples or pixels that contains all lit pixels or samples within one or more predetermined portion of the rasterizer tile.

In furtherance of the one or more first embodiment, the depth testing unit further includes a z-data compressor including logic circuitry to store a representation of a prevailing group of pixels or samples identified by the corner depth test logic circuitry in a depth plane equation format in response to the depth values being continuous over the source data bound. The z-data compressor also includes logic circuitry to store a representation of the prevailing group in a depth minimum/maximum format in response to the depth values being discontinuous over the source data bound.

In furtherance of the one or more first embodiment, the depth testing unit further includes depth range testing logic circuitry to determine a source depth range associated with the source depth values. The depth testing unit further includes depth range testing logic circuitry to determine a destination depth range associated with the destination depth values, and to determine which of the source and destination depth ranges prevails. The depth testing unit further selects between the range testing logic circuitry and the corner test logic circuitry based on the continuity of the destination depth data within the source data bound.

In furtherance of the one or more first embodiment, the depth testing unit is to deem the four-corner test ambiguous in response to at least one corner test having a different result than the another, and is to pass the source data group to a subsequent processing stage where the pixels or samples of the data group are to be tested individually.

In one or more second embodiments, a graphics processor includes a rasterizer to output a rasterizer tile comprising a first plurality of pixels or samples. The graphics processor includes a bounding-box generator including logic circuitry coupled to an output of the rasterizer to determine from the rasterizer tile a bounding-box of variable size. The graphics processor includes a depth testing unit including logic circuitry coupled to the bounding-box generator to perform a depth test of a source data group of the pixels or samples within the bounding-box.

In furtherance of the one or more second embodiments, the bounding-box generator includes logic circuitry to determine a bounding rectangle of minimum size based on the pattern of lit pixels within the rasterizer tile.

In furtherance of the one or more second embodiments, the bounding-box generator logic circuitry includes a priority encoder to determine first and second bounding-box corners.

In furtherance of the one or more second embodiments, the depth testing unit further includes interpolation logic circuitry to determine a source depth plane equation representative of the source data group. The depth testing unit further includes corner depth test logic circuitry to compare source depth values with destination depth values. The source depth values are to be determined from evaluations of the source depth plane equation at each of four corners of the source data group bound, and the destination depth values are to be determined for positions in a destination depth plane corresponding to the four corners.

In one or more third embodiment, a method of depth testing in graphics processing includes receiving a source data group of pixels or samples bounded within a rasterizer tile. The method includes determining a source depth plane equation representative of the source data group. The method includes determining source depth data by evaluating the source depth plane equation at each of four corners of the source data group bound. The method includes determining destination depth data for positions in a destination depth plane corresponding to the four corners. The method includes performing a corner depth test by comparing the source depth data with the destination depth data.

In furtherance of the one or more third embodiments, the method further includes representing the source depth data in a depth buffer in response to the source depth data prevailing in the corner depth test. The source depth data representation comprises elements of the source depth plane equation in response to the pixels or samples within the source data bound being fully lit. The source depth data representation comprises a minimum and maximum depth value in response to at least one of the pixels or samples within the source data being unlit.

In furtherance of the one or more third embodiments, performing the corner depth tests is predicated on the destination data being continuous within the source data bound. In response to the destination data being discontinuous within the source data bound the method further comprises performing a depth range test by comparing the a range of the source depth data with a range of the destination depth data.

In furtherance of the one or more third embodiments, the method further includes determining a maximum quantization error for the source depth plane and destination depth plane. The method further includes storing depth data associated with the source data group bound based on a result of the corner depth test. The prevailing source or destination depth data is stored as a plane equation in response to the maximum quantization error being less than the minimum difference between the four corner depths determined for the source depth and destination depth planes.

In one or more fourth embodiment, a method of depth testing in graphics processing includes receiving a rasterizer tile including a plurality of pixels or samples. The method includes determining from the rasterizer tile a bounding-box of variable size. The method includes depth testing a source data group of the pixels or samples within the bounding-box.

In furtherance of the one or more fourth embodiment, determining the bounding-box of variable size further includes determining a minimum size of the source data group based on the pattern of lit pixels within the rasterizer tile.

In furtherance of the one or more fourth embodiment, determining the bounding-box of variable size further includes dividing the rasterizer tile into a plurality of rectangular grouping having a same number of pixels or samples, and reducing each rectangular grouping to the smallest rectangular grouping that contains all lit pixels.

In furtherance of the one or more fourth embodiment, determining the bounding-box of variable size further comprises determining a source data group of minimal size that includes all lit pixels or samples within a predetermined portion of the rasterizer tile. Determining the source data group of minimal size further includes determining a xy position of the source data group with sub-pixel resolution.

In one or more fifth embodiment, at least one computer-readable storage medium stores instructions thereon, which when executed by a processing system, cause the system to perform the method including receiving a source data group of pixels or samples bounded within a rasterizer tile. The method includes determining a source depth plane equation representative of the source data group. The method includes determining source depth data by evaluating the source depth plane equation at each of four corners of the source data group bound. The method includes determining destination depth data for positions in a destination depth plane corresponding to the four corners. The method includes comparing the source depth data with the destination depth data.

In one or more sixth embodiment, at least one computer-readable storage medium stores instructions thereon, which when executed by a processing system, cause the system to perform the method including receiving a rasterizer tile including a plurality of pixels or samples, determining from the rasterizer tile a bounding-box of variable size, and depth testing a source data group of the pixels or samples within the bounding-box.

In one or more seventh embodiment, one or more computer-readable storage medium stores instructions thereon, which when executed by a processing system, cause the system to perform any of the methods described above.

In one or more eighth embodiment, a graphics processor includes a means for performing any of the methods described above.

In one or more ninth embodiment, a graphics processor includes a first means for receiving a source data group of pixels or samples bounded within a rasterizer tile. A graphics processor includes a second means coupled to the first means for determining a source depth plane equation representative of the source data group. A graphics processor includes a third means coupled to the second means for determining source depth data by evaluating the source depth plane equation at each of four corners of the source data group bound. A graphics processor includes a fourth means coupled to the third means for determining destination depth data for positions in a destination depth plane corresponding to the four corners. A graphics processor includes a fifth means coupled to the fourth means for performing a corner depth test by comparing the source depth data with the destination depth data.

In one or more ninth embodiment, a graphics processor includes a first means for receiving a rasterizer tile including a plurality of pixels or samples. In one or more ninth embodiment, a graphics processor includes a second means coupled to the first means for determining from the rasterizer tile a bounding-box of variable size. In one or more ninth embodiment, a graphics processor includes a third means coupled to the second means for depth testing a source data group of the pixels or samples within the bounding-box.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A graphics processor, comprising:
a rasterizer to output a rasterizer tile comprising a first plurality of pixels or samples; and
a depth testing unit including logic circuitry coupled to an output of the rasterizer to receive a source data group bounded within the rasterizer tile, wherein the depth testing unit further comprises:
interpolation logic circuitry to determine a source depth plane equation representative of the source data group;
corner depth test logic circuitry to compare source depth data with destination depth data, the source depth data determined from evaluations of the source depth plane equation at each of four corners of the source data group bound, and the destination depth data determined for positions in a destination depth plane corresponding to the four corners; and
z-data compressor logic circuitry to store a representation of a prevailing group of pixels or samples identified by the corner depth test logic circuitry, the representation being either in a depth plane equation format in response to the depth values being continuous over the source data bound, or in a depth minimum/maximum format in response to the depth values being discontinuous over the source data bound.

2. The graphics processor of claim 1, wherein the depth testing unit further comprises a bounding-box logic circuitry coupled to the output of the rasterizer to determine a bounding-box within the rasterizer tile, the bounding-box being of variable size and defining the source data group over which the depth test is to be performed.

3. The graphics processor of claim 2, wherein the bounding-box logic circuitry is to determine the smallest rectangular grouping of samples or pixels that contains all lit pixels or samples within one or more predetermined portion of the rasterizer tile.

4. The graphics processor of claim 1, wherein the depth testing unit further comprises depth range testing logic circuitry to:
determine a source depth range associated with the source depth values;
determine a destination depth range associated with the destination depth values; and
determine which of the source and destination depth ranges prevails; and
wherein the depth testing unit selects between the depth range testing logic circuitry and the corner depth test logic circuitry based on the continuity of the destination depth data within the source data bound.

5. The graphics processor of claim 1, wherein the depth testing unit is to deem the four-corner test ambiguous in response to at least one corner test having a different result than another, and is to pass the source data group to a subsequent processing stage where the pixels or samples of the data group are to be tested individually.

6. A graphics processor, comprising:
a rasterizer to output a rasterizer tile comprising a first plurality of pixels or samples;
a bounding-box generator including logic circuitry coupled to an output of the rasterizer to determine a bounding-box within the rasterizer tile, of variable size, and defining a source data group of the pixels or samples over which a depth test is to be performed; and
a depth testing unit including logic circuitry coupled to the bounding-box generator to perform a depth test on the source data group at each of four corners of the bounding-box.

7. The graphics processor of claim 6, wherein the bounding-box generator includes logic circuitry to determine a bounding rectangle based on the pattern of lit pixels within the rasterizer tile.

8. The graphics processor of claim 6, wherein the bounding-box generator logic circuitry includes a priority encoder to determine first and second bounding-box corners.

9. The graphics processor of claim 6, wherein the depth testing unit further comprises:
interpolation logic circuitry to determine a source depth plane equation representative of the source data group; and
corner depth test logic circuitry to compare source depth values with destination depth values, the source depth values determined from evaluations of the source depth plane equation at each of four corners of the source data group bounding-box, and the destination depth values determined for positions in a destination depth plane corresponding to the four corners.

10. A method of depth testing in graphics processing, the method comprising:
receiving a source data group of pixels or samples bounded within a rasterizer tile;
determining a source depth plane equation representative of the source data group;
determining source depth data by evaluating the source depth plane equation at each of four corners of the source data group bound;
determining destination depth data for positions in a destination depth plane corresponding to the four corners;
performing a corner depth test by comparing the source depth data with the destination depth data; and
storing a representation of a prevailing group of pixels or samples identified by the corner depth test, the representation in either a depth plane equation format in response to the depth values being continuous over the source data bound, or a depth minimum/maximum format in response to the depth values being discontinuous over the source data bound.

11. The method of claim 10, further comprising representing the source depth data in a depth buffer in response to the source depth data prevailing in the corner depth test, wherein:
the source depth data representation comprises elements of the source depth plane equation in response to the pixels or samples within the source data bound being fully lit; and
the source depth data representation comprises a minimum and maximum depth value in response to at least one of the pixels or samples within the source data being unlit.

12. The method of claim 10, wherein performing the corner depth tests is predicated on the destination data being continuous within the source data bound, and wherein in response to the destination data being discontinuous within the source data bound the method further comprises performing a depth range test by comparing the a range of the source depth data with a range of the destination depth data.

13. The method of claim 10, further comprising:
determining a maximum quantization error for the source depth plane and destination depth plane; and storing depth data associated with the source data group bound based on a result of the corner depth test, wherein the prevailing source or destination depth data is stored as a plane equation in response to the maximum quantization error being less than the minimum difference between the four corner depths determined for the source depth and destination depth planes.

14. A method of depth testing in graphics processing, the method comprising:
receiving a rasterizer tile including a plurality of pixels or samples;
determining a bounding-box within the rasterizer tile, of variable size, and defining a source data group of the pixels or samples over which a depth test is to be performed; and
depth testing the source data group at each of four corners of the bounding-box.

15. The method of claim 14, wherein determining the bounding-box of variable size further comprises determining a size of the source data group based on the pattern of lit pixels within the rasterizer tile.

16. The method of claim 14, wherein determining the bounding-box of variable size further comprises:
dividing the rasterizer tile into a plurality of rectangular groupings having a same number of pixels or samples; and
reducing the size of each of the rectangular groupings to the smallest rectangular grouping that contains all lit pixels.

17. The method of claim 14, wherein determining the bounding-box of variable size further comprises determining a source data group that includes all lit pixels or samples within a predetermined portion of the rasterizer tile, and wherein determining the source data group further comprises determining a xy position of the source data group with sub-pixel resolution.

18. One or more computer-readable storage medium storing instructions thereon, which when executed by a processing system, cause the system to perform the method comprising:
receiving a source data group of pixels or samples bounded within a rasterizer tile;
determining a source depth plane equation representative of the source data group;
determining source depth data by evaluating the source depth plane equation at each of four corners of the source data group bound;
determining destination depth data for positions in a destination depth plane corresponding to the four corners;
comparing the source depth data with the destination depth data; and
storing a representation of a prevailing group of pixels or samples identified by the corner depth test, the representation in either a depth plane equation format in response to the depth values being continuous over the source data bound, or a depth minimum/maximum format in response to the depth values being discontinuous over the source data bound.

19. One or more computer-readable storage medium storing instructions thereon, which when executed by a processing system, cause the system to perform the method comprising:
receiving a rasterizer tile including a plurality of pixels or samples;
determining a bounding-box within the rasterizer tile, of variable size, and defining a source data group of the pixels or samples over which a depth test is to be performed; and
depth testing the source data group at each of four corners of the bounding-box.

* * * * *